V. LOEWENBERG.
COMBINATION BED AND DOUCHE PAN.
APPLICATION FILED APR. 3, 1919.
1,376,956.
Patented May 3, 1921.
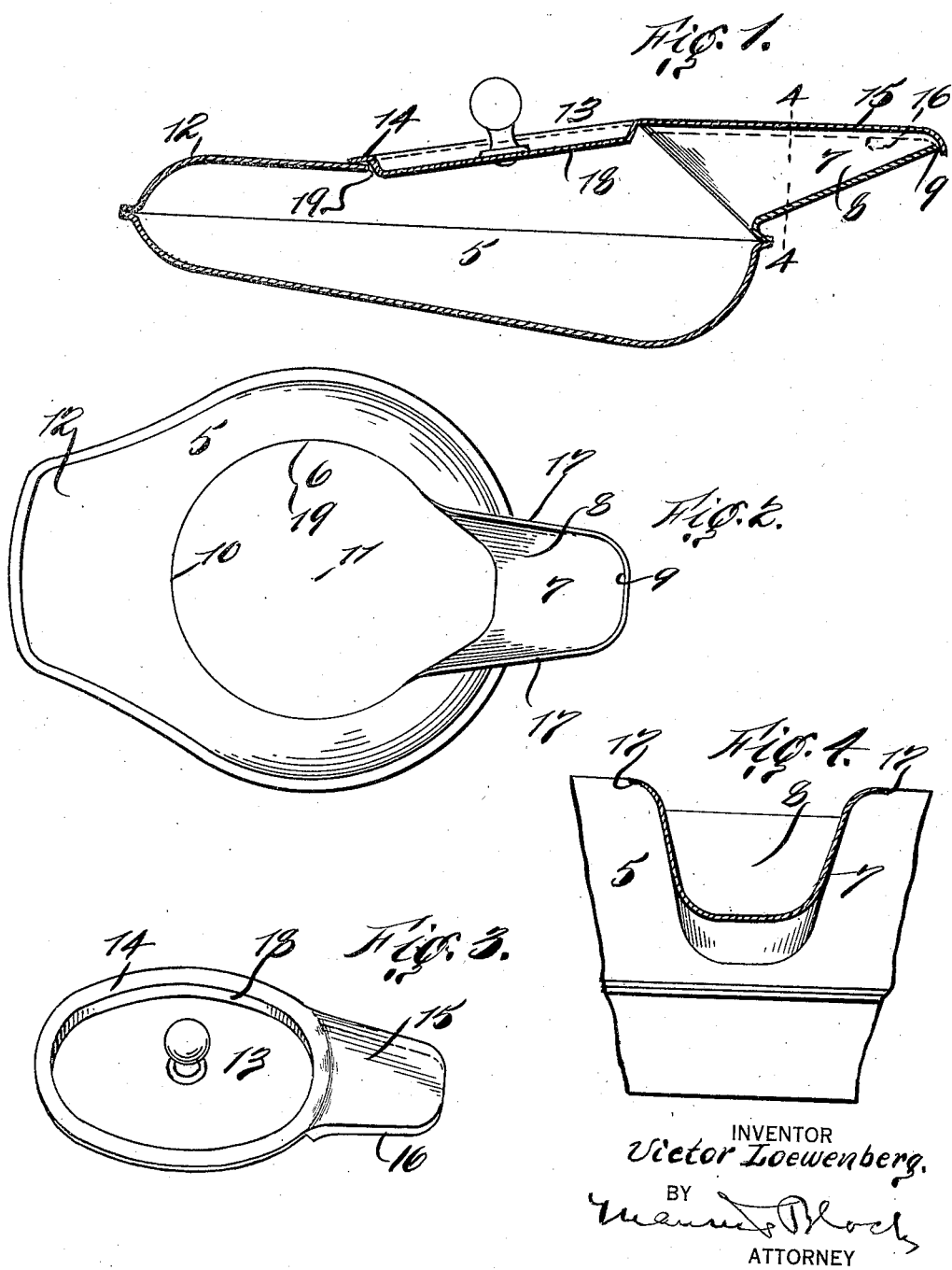
INVENTOR
Victor Loewenberg.
BY
ATTORNEY

UNITED STATES PATENT OFFICE.

VICTOR LOEWENBERG, OF NEW YORK, N. Y.

COMBINATION BED AND DOUCHE PAN.

1,376,956.  Specification of Letters Patent.  Patented May 3, 1921.

Application filed April 3, 1919. Serial No. 287,159.

*To all whom it may concern:*

Be it known that I, VICTOR LOEWENBERG, a citizen of the United States of America, residing at New York city, county and State of New York, have invented certain new and useful Improvements in Combination Bed and Douche Pans, of which the following is a full, clear, and exact description.

This invention relates to improvements in bed-pans, the object being to provide a bed-pan that is arranged to be used for douche purposes. The object of my invention is to provide a bed-pan having a mouth-piece or spout arranged for the insertion of a hand, whereby a douching instrument may be applied to a person while sitting upon the pan. In short my improved pan is arranged so that a person can be treated while seated upon the pan; in other words, a catheter or vaginal syringe can be passed without the necessity of causing the person to rise off the pan. To accomplish this result, I form the mouth or spout of the pan wide enough to permit of the passage of the hand of the operator. My improved bed-pan is also rendered sanitary by the employment of a one-piece cover for the large opening in the pan and for the spout or mouth; hence there will be no joints.

So far as I am aware, I am the first to produce a bed-pan having an opening in the top thereof and a mouth or spout of channel formation providing a gutter, so to speak, that is in communication with the interior of the pan. Bed-pans are usually provided with a tubular spout through which the hands cannot be passed and are for this reason totally different from my improved pan.

I will now describe my improved bed-pan in detail, the novel features of which I will point out in the appended claims, reference being had to the accompanying drawing, wherein—

Figure 1 is a sectional view of a bed-pan embodying my improvement;

Fig. 2 is a top plan view thereof on a reduced scale;

Fig. 3 is a detail perspective view of the cover; and

Fig. 4 is an enlarged cross sectional view, the section being taken on a line 4—4 in Fig. 1.

My improved bed-pan consists of a bowl portion 5 having an opening 6 in the top thereof for the usual purpose. The bowl portion 5 has connected therewith a spout or mouth 7 of channel formation to provide space for the passage of a hand through said spout and into the bowl 5. As can be seen the opening 6, in the top wall of the bowl, communicates with the channel or open space 8 of the spout 7. By this means the top of the pan is entirely open from the front edge 9 of the spout to a point 10 somewhat to the rear of the center 11 of the pan, as well as for a considerable distance transversely of the pan at the center of the bowl portion 5. The bowl portion 5 is extended at 12 to provide a seat for the user, as is usual in articles of this nature.

The usual form of bed-pan is provided with an opening similar to opening 6, but the spout portions of such pans are not arranged to provide an open communicating channel, as in Fig. 4, and the hands of the operator cannot be passed therethrough. My improved pan formation permits of the free passage of the hands through the spout, or mouth portion thereof, as is evident.

A further feature of my invention consists of a cover 13 having a lid-member 14 to cover opening 6 and a lid-member 15 to cover the open portion (the top) of the mouth or spout 7. The lid-members 14 and 15 are preferably formed integral one with the other. The portion 15 of the cover carries a flange 16 to overlie the edges 17 of the spout or mouth 7. The lid-member 14 carries a depressed portion 18 to snugly fit the wall 19 of the opening 6. By this means I am able to completely seal the pan after it has been used.

Having described my invention, what I claim is:—

1. In a bed pan, a bowl portion having an inclined top with an opening therein, an open top extension projecting rearwardly from said bowl, the bottom wall of said extension arranged in substantial parallel relation with the inclined top of the bowl thereby permitting a straight passage through the extension and directly into the bowl beneath the opening in the top thereof.

2. In a bed pan, a bowl portion having an inclined top with an opening therein, an open top extension projecting rearwardly from said bowl, said extension being of gradual tapering formation in depth thereby permitting a substantially straight passage therethrough and directly into the bowl beneath the top opening therein.

3. In a bed pan, a bowl portion having an inclined top with an opening therein, an open top extension projecting rearwardly from said bowl, the bottom wall of said extension inclined upwardly in substantial parallel relation with the inclined top of the bowl thereby permitting a straight passage through the extension and directly into the bowl beneath the opening in the top thereof.

Signed at New York city, N. Y., this 1st day of April, 1919.

VICTOR LOEWENBERG.

Witnesses:
 EDWARD A. JARVIS,
 MAURICE BLOCK.